US 8,819,138 B2

(12) United States Patent
Houston et al.

(10) Patent No.: US 8,819,138 B2
(45) Date of Patent: Aug. 26, 2014

(54) IDENTIFYING CONTENT ITEMS FOR INCLUSION IN A SHARED COLLECTION

(71) Applicant: Dropbox, Inc., San Francisco, CA (US)

(72) Inventors: Drew Houston, San Francisco, CA (US); Chris Beckmann, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 13/840,198

(22) Filed: Mar. 15, 2013

(65) Prior Publication Data

US 2014/0122592 A1     May 1, 2014

Related U.S. Application Data

(60) Provisional application No. 61/719,870, filed on Oct. 29, 2012.

(51) Int. Cl.
*G06F 15/16*     (2006.01)
(52) U.S. Cl.
USPC .......................................... 709/204; 715/751
(58) Field of Classification Search
USPC .............. 715/246, 738, 753; 707/3, 104.1, 9; 705/8; 726/29; 709/203, 204; 455/518
See application file for complete search history.

(56) References Cited

U.S. PATENT DOCUMENTS

| 7,266,383 | B2 * | 9/2007 | Anderson ..................... 455/518 |
| 2005/0033623 | A1 * | 2/2005 | Zemborain ....................... 705/8 |
| 2007/0156434 | A1 * | 7/2007 | Martin et al. ..................... 705/1 |
| 2008/0052349 | A1 * | 2/2008 | Lin ............................. 709/203 |
| 2008/0215964 | A1 * | 9/2008 | Abrams et al. ................ 715/246 |
| 2008/0288499 | A1 * | 11/2008 | Choi et al. ........................ 707/9 |
| 2009/0157608 | A1 * | 6/2009 | Strathearn et al. ................ 707/3 |
| 2009/0216806 | A1 * | 8/2009 | Feuerstein et al. ......... 707/104.1 |
| 2011/0167353 | A1 * | 7/2011 | Grosz et al. .................... 715/738 |
| 2012/0131102 | A1 * | 5/2012 | Gabos et al. ................... 709/204 |
| 2012/0331568 | A1 * | 12/2012 | Weinstein et al. .............. 726/29 |
| 2013/0080919 | A1 * | 3/2013 | Kiang et al. ................... 715/753 |

* cited by examiner

*Primary Examiner* — Dustin Nguyen
(74) *Attorney, Agent, or Firm* — Novak Druce Connolly Bove + Quigg LLP (57) ABSTRACT

Systems, methods, and computer-readable storage media for managing pooled collections of content items, such as photos, in a content management system. An example system can first receive, from a first user device, images uploaded to a first account at a synchronized online content management system, and cluster at least some of the images as a collection. The system can receive, from the first user, a request to share the collection with a second user having a second account at the content management system, and generate, in response to the request, a pooled collection at the content management system from the collection. The system can transmit an invitation to the second user to join the pooled collection, and, upon acceptance, link the pooled collection to the second user account so that the first user and the second user have access to images in the persistent pooled collection and have permission to contribute content to the pooled collection.

20 Claims, 8 Drawing Sheets

```
402
 ┌─────────────────────────────────────────┐
 │ 📁 FOLDER X                             │
 │ 📁 FOLDER Y                             │
 │ 📁 FOLDER Z                             │
 │                                         │
 │    DCIN0016.jpg   10/16/2012   4:58PM   │
 │   ┌DCIN0018.jpg   11/25/2012   8:30PM   │
 │   └DCIN0036.jpg   11/26/2012  12:07AM   │
 │    DCIN0056.jpg   12/01/2012   6:06PM   │
 │    DCIN0071.jpg   12/16/2012  01:01PM   │
 └─────────────────────────────────────────┘
```
404 brackets DCIN0018.jpg and DCIN0036.jpg

FIG. 5

500
POOLED ALBUM INVITATION FROM USER 1 — 502

IMG6217   IMG6218   IMG6219

504

ACCEPT — 606

IDENTIFYING CONTENT ITEMS FOR INCLUSION IN A SHARED COLLECTION

CROSS REFERENCE TO RELATED APPLICATIONS

This application claims the benefit of priority under 35 U.S.C. §119(e) to U.S. Provisional Patent Application No. 61/719,870, filed on Oct. 29, 2012, which is incorporated herein by reference in its entirety.

TECHNICAL FIELD

The present technology pertains to shared data, and more specifically pertains to shared or pooled collections in an online storage environment.

BACKGROUND

As users migrate from local storage to network based or online storage of personal data such as photos, documents, music, movies, or other files, additional functionality can be exposed. For example, users can more easily share with others a web link to a collection of photos stored in the online storage. Users can organize files stored in the online storage into a hierarchy of files and folders, or into logical albums or collections. However, the details and additional complexity of network based file storage provide difficulties and additional opportunity for sharing data in the online storage environment.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can be used to share data of one account with another account via a persistent pooled collection hosted by a content management system. One such example of a persistent pooled collection is a persistent pooled photo album of individual photos. A content management system can provide a limited or finite amount of storage space for each account to store data. A pooled collection can provide a common space to which a user of the content management system can contribute data, content items, files, and/or storage space from the user's account for use or access by other users associated with the pooled collection. A pooled collection can be associated with multiple users, and each user can choose to contribute some quantity of storage space from his or her own account to the pooled collection. Each user can contribute an equal quantity of storage space to the pooled collection, or each user can contribute a different quantity of storage space. In one variation, a pooled collection can be a persistent storage area, such as a folder, containing either the actual files or data, or pointers to the data stored in the respective user accounts.

Disclosed are systems, methods, and non-transitory computer-readable storage media for generating a pooled collection. An example system configured to practice the method can receive, from a first user device, content items, such as images, documents, video files, applications, and so forth, uploaded to a first account at a content management system. The system can cluster at least some of the content items as a collection corresponding to a commonality, such as chronological boundaries, an event, photo tags, content of the content items, and so forth. The system can optionally cluster the content items into sets corresponding to time and location. The system can notify the first user or other user of the sets, or can generate a log entry reflecting the clustering. Notifications can include information such as a number of content items, a location, a date, a time, or a set storage size.

The system can receive, from the first user, a request to share the collection with a second user having a second account at the content management system. In one variation, the system can present a list of content items in the collection to the first user prior to the request to share the collection. The system can receive input from the first user indicating a list of content items to include in the collection, and can update the collection based on the input. The system can generate, in response to the request, a persistent pooled collection at the content management system from the collection. The system can generate the persistent pooled collection by generating pointers in the persistent pooled collection that reference the content items uploaded to the first account.

The system can transmit an invitation to join the persistent pooled collection to the second user. Upon the second user accepting the invitation, the system can link the persistent pooled collection to the second account so that the first user and the second user have access to content items in the persistent pooled collection and have permission to contribute content items to the persistent pooled collection. The system can update the collection by at least one of adding, removing, moving, copying, or renaming an content item in the collection, or editing collection details. After the pooled collection is created, the system can track changes to one of the persistent pooled collection or content items in the persistent pooled collection in a revision history. In this variation, the system can provide an interface for browsing the revision history and restore a previous version of an content item in the persistent pooled collection.

The system can continue to populate the persistent pooled collection by identifying second content items in the second account that correspond to the identified commonality for the persistent pooled collection, such as a set of chronological boundaries, and transmitting to the second user a notification suggesting that second content items be added to the persistent pooled collection. Commonalities can be determined based on any content item attribute and/or what is contained within a content item. Upon receiving an affirmative response to the notification from the second user, the system can add the second content items to the persistent pooled collection. Generating the persistent pooled collection can include generating pointers in the persistent pooled collection, wherein the pointers reference the second content items in the second account.

Further, the system can identify additional content items, of the same type as those already in the persistent pooled collection or of other types, to contribute to the persistent pooled collection, based on the identified commonality. The system can then either automatically contribute those additional content items to the persistent pooled collection, or can prompt the appropriate user to approve their contribution to the collection. When accepting an invitation to join a persistent pooled collection, a user can indicate whether or not to authorize the system to scan their account for content items to contribute, and the details of how to contribute those content items. In another variation, the user sharing the persistent pooled collection can establish settings for the collection so that a condition of participating in the pooled collection is allowing the system to scan for and automatically add relevant content items.

Another example method embodiment handles deletions from a pooled collection. The system receives, from a first user device associated with a pooled collection including a persistent collection of pointers referencing content items from multiple user accounts in a content management system, a request to delete an content item in the pooled collection, wherein the first user is associated with a first user account.

Upon determining that the content item is contributed to the pooled collection from the first user account, the system copies the content item to a new location outside of the first user account, removes the pointer to the content item from the instance of the pooled collection associated with the first user, and deletes the content item from the first user account. The new location outside of the first user account can be a storage space associated with the pooled collection. The new location outside of the first user account can include a user account associated with another user of the pooled collection. In one variation, the system further updates the pointer in the pooled collection to reference the new location for remaining users of the pooled collection other than the first user. The system can copy the content item to a new location by copying the content item to each user account, other than the first user account, associated with the pooled collection, essentially replicating the content item to respective storage spaces associated with each other account. Alternatively, the system can copy the content item to a new location by identifying a primary user of the pooled collection, and a primary user account associated with the primary user, then copying the content item to the primary user account. The system can notify the primary user that the content item has been copied to the primary user account. The system can select any user of the pooled collection as the primary user.

If the content management system tracks version histories for content items, the system can also delete any available versions of the content item to delete, regardless of the account or collection in which the versions reside. In one variation, a contributor of a content item to the collection may have permission, for example, to delete the contributed content item, but not any subsequent revisions, while an administrator for the collection may have permission to remove all or part of the versions indicated in the version history.

While these principles are discussed generically in terms of content items, the same principles can be applied to content items of a variety of types, such as images, documents, video, audio, source code, applications, and so forth. Content items can be represented as files or as folders, for example. The commonality for a particular pooled collection may vary based on the type of information available for each file type. For example, an application content item may not be associated with a date-stamp for image content items, but may be associated with other metadata that an image content item does not include, such as number of times the application was executed.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that this is done for illustration purposes only. A person skilled in the art will recognize that other components and configurations may be used without departing from the spirit and scope of the disclosure.

The disclosed technology addresses the need in the art for identifying content items, such as photos or other file types, from various different storage accounts to contribute to a shared collection, such as contributing photos to a shared or pooled photo album. Specifically, an example system can automatically identify content items such as files or folders to contribute to a shared or pooled collection. Various embodiments of the disclosure are described in detail below. While specific implementations are described, it should be understood that this is done for illustration purposes only. Other components and configurations may be used without parting from the spirit and scope of the disclosure. The present disclosure addresses sharing of files, folders, or other data in storage spaces hosted by a network enabled storage provider. Two or more user accounts can contribute data, storage space, or other resources to a pooled collection that becomes available for other users of the pooled collection to browse, access, or modify. In one variation, the pooled collection can be a shared collection of pointers to the data residing in the respective users' accounts. In another variation, the pooled collection can use contributed storage space to host the data, and users' accounts can have pointers that point to the data stored at the content management system.

An example process for creating a pooled collection cab start with a user uploading content items to their account with a content management system, such as through a web-based portal, a client application that synchronizes between local content items and content items stored at the content management system, or some other interface. For example, the content management system can cluster the content items by date, and recognize that a set of them corresponds to a certain date/time/location signature, or can cluster content items based on any other single attribute or multiple attributes of the content items. The content management system can send an optional notification such as "You uploaded 427 photos from last Saturday, do you want to share those photos?" In this example, when the user indicates a desire to share the photos, the content management system can present a photo browsing interface through which the user provides input, such as through a single click-to-share button, to create a collection and to share that collection. The content management system can create a persistent pooled collection. When creating the collection, the content management system retains the source data, which can optionally be defined by some commonality, such as chronological boundaries or some other common or shared attribute, such as a specific tag, a location, or recognized faces. When creating a collection, the user can optionally remove content items the user does not like, such as content items that are private, confidential, sensitive, embarrassing, or that the user otherwise does not want to share. The content management system can identify sharing recipients automatically based on contents or metadata of the files in the pooled collection or based on user input, and send invitations to the recipients via their online storage account, email, a social network, text message, or any other messaging medium. When the recipient views the pooled collection, the system can compare the recipient's content items to the content items in the pooled collection, and prompt the recipient to add sufficiently similar content items to the pooled collection. The content management system and/or a client device can perform the comparison of content items to determine if content items are sufficiently similar.

Figure 1:
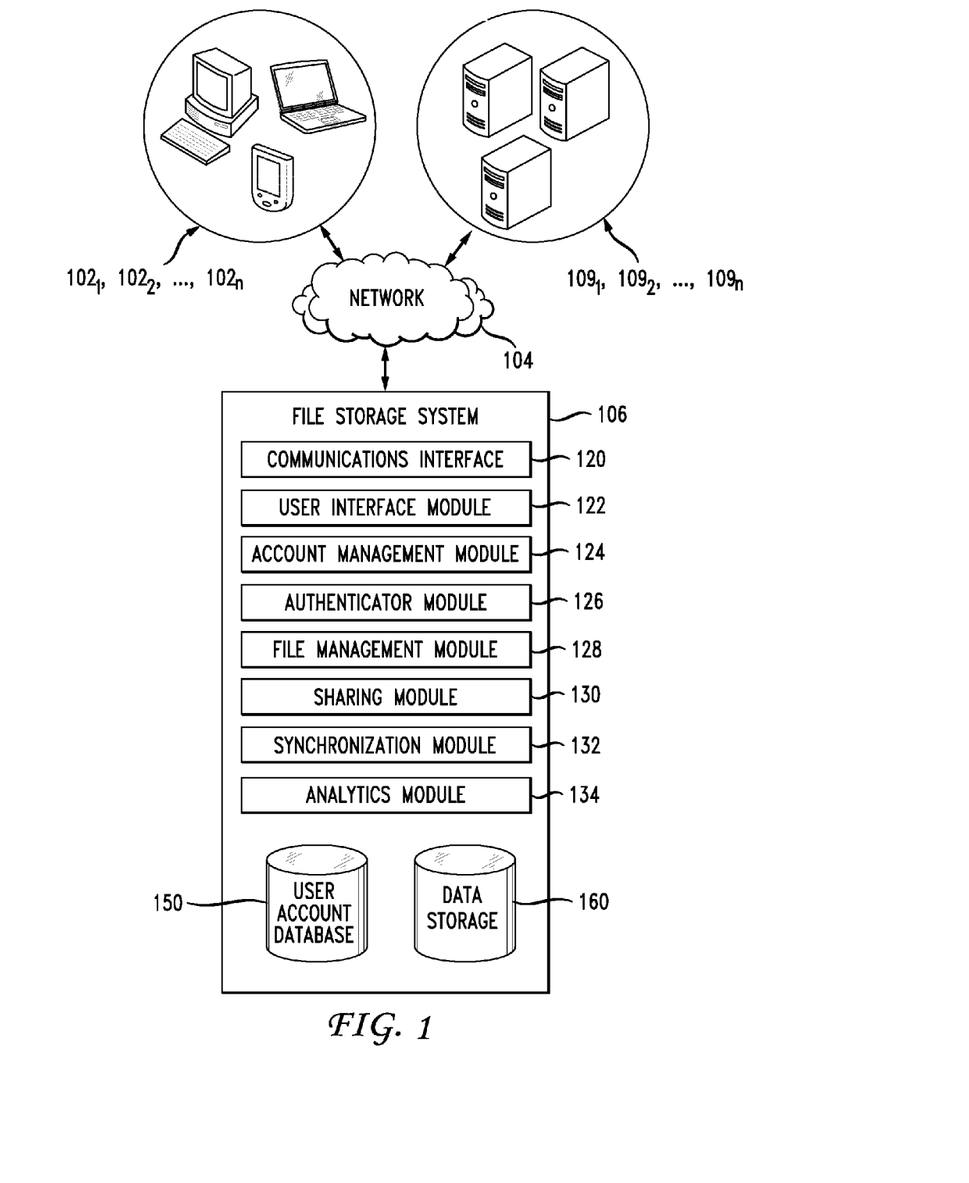
FIG. 1 shows an exemplary configuration of devices and a network in accordance with the invention.

An exemplary system configuration 100 is illustrated in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 through client devices $102_1, 102_2, \ldots, 102_n$ (collectively "102") connected to network 104 by direct and/or indirect communication. Content management system 106 can support connections from a variety of different client devices, such as desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can make it possible for a user to store content, as well as perform a variety of content management tasks, such as retrieve, modify, browse, and/or share the content. Furthermore, content management system 106 can make it possible for a user to access the content from multiple client devices 102. For example, client device $102_i$ can upload content to content management system 106 via network 104. The content can later be retrieved from content management system 106 using the same client device $102_i$ or some other client device $102_j$.

To facilitate the various content management services, a user can create an account with content management system 106. The account information can be maintained in user account database 150. User account database 150 can store profile information for registered users. In some cases, the only personal information in the user profile can be a username and/or email address. However, content management system 106 can also be configured to accept additional user information.

User account database 150 can also include account management information, such as account type, e.g. free or paid; usage information, e.g. file edit history; maximum storage space authorized; storage space used; content storage locations; security settings; personal configuration settings; content sharing data; etc. Account management module 124 can be configured to update and/or obtain user account details in user account database 150. The account management module 124 can be configured to interact with any number of other modules in content management system 106.

An account can be used to store content, such as documents, text files, audio files, video files, etc., from one or more client devices 102 authorized on the account. The content can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device $102_i$. However, content management system 106 can store the content items in its own order, arrangement, or hierarchy. Content management system 106 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate files or duplicate segments of files. Instead of storing multiple copies, content storage 160 can store a single copy and then use a pointer or other mechanism to link the duplicates to the single copy. Similarly, content storage 160 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content that has been updated at content management system 106 and synchronize those changes to the local folder. The client software can provide notifications of synchronization operations, and can provide indications of content statuses directly within the content management application. Sometimes client device $102_i$ may not have a network connection available. In this scenario, the client software can monitor the linked folder for file changes and queue those changes for later synchronization to content management system 106 when a network connection is available. Similarly, a user can manually stop or pause synchronization with content management system 106.

A user can also view or manipulate content via a web interface generated and served by user interface module 122. For example, the user can navigate in a web browser to a web address provided by content management system 106. Changes or updates to content in the content storage 160 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 106 can include a communications interface 120 for interfacing with various client devices 102, and can interact with other content and/or service providers $109_1$, $109_2$, ..., $109_n$ (collectively "109") via an Application Programming Interface (API). Certain software applications can access content storage 160 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access files. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 is presented with specific components, it should be understood by one skilled in the art, that the architectural configuration of system 106 is simply one possible configuration and that other configurations with more or less components are also possible. For example, content management system 106 can include a module for identifying a commonality for a pooled collection, and a module for scanning other accounts for files within a threshold similarity to the commonality.

Figure 2:
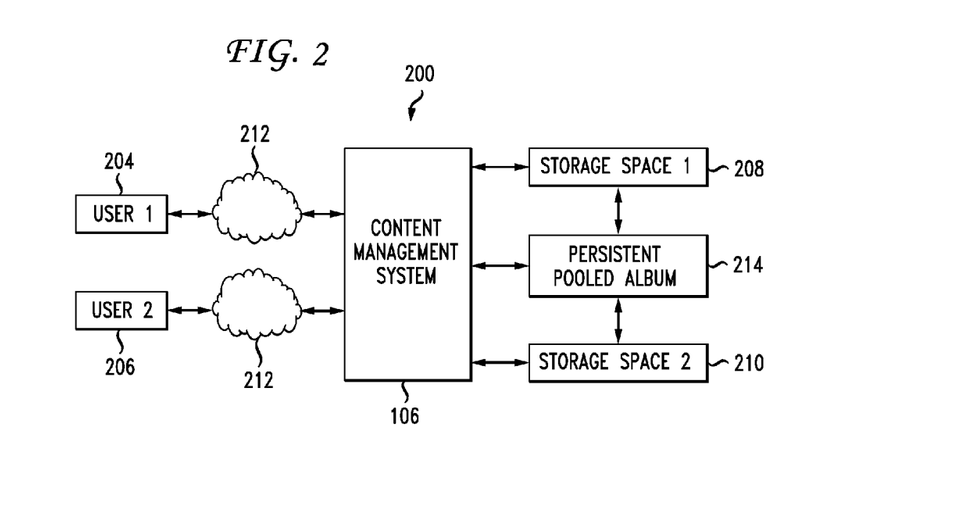
FIG. 2 shows an example architecture for a pooled collection.

Having disclosed some components of a computing system and an example content management system, the disclosure now turns to FIG. 2, which shows an example architecture 200 for a pooled collection hosted by content management system 202. Users having accounts with content management system 202 can join the pooled collection and can contribute resources to the pooled collection, or users may be required to contribute resources as a condition for joining the pooled collection. First user 204 and second user 206 can communicate with content management system 202 via network 212, each user 204, 206 having their own respective storage space 208, 210 or account at content management system 202. Each of users 204, 206 can contribute a portion of their storage space 208, 210 or files contained therein to persistent pooled collection 212. Persistent pooled collection 212 can be accessible, through content management system 202, to both users 204, 206. Thus, if each user 204, 206 contributes files to persistent pooled collection 212, each other user can view, access, and manipulate those files.

In one variation, persistent pooled collection 212 represents files in persistent pooled collection 212 as pointers to files stored in respective storage spaces 208, 210. In another variation, content management system 202 actually moves files from respective storage spaces 208, 210 to a storage space associated with persistent pooled collection 212, and deducts or reserves from contributing storage spaces 208, 210 to accommodate the files. The system can represent persistent pooled collection 212 as a folder in storage spaces 208, 210. Further, the system can provide read and/or write access to persistent pooled collection 212 to users 204, 206 via a web interface or read-only access via the web interface to other users that are not contributing resources to persistent pooled collection 212. In one variation, users 204, 206 contribute different types of resources for persistent pooled collection. For example, first user 204 may contribute unused storage space to persistent pooled collection 212, which content management system 202 deducts, holds, or reserves from the account of first user 204. Second user 206 can then contribute files to store in the storage space of persistent pooled collection 212 that was contributed by first user 204. More than two users can participate in persistent pooled collection 212, each contributing equally to pooled collection 212 or contributing in different ways, such as contributing different quantities of files or storage space. Similarly, users of a pooled collection may have different permissions, such as an administrator group of users and a non-administrator group of users.

A user can store a large quantity of photos in their account with the content management system. The system can detect an event as a set of photos that the user wants to share with someone else. The system can provide a prompt to the user indicating which photos are grouped together into an event, and an actual or proposed title for the event. Then, either with geo-location metadata, face recognition, or some other content or metadata processing, the content management system can guess recipients of the sharing. The user can make the final decision to share the photos. The recipient, when receiving that sharing invitation, can search for corresponding events, albums, or photos in their own account to add to the pooled collection.

The system can represent pooled items using a collections mechanism works across multiple users. The pooled collection can receive input, data, or content items from two or more different users. The pooled collection can include pointers to two or more users' data in their respective accounts.

Users participating in the pooled collection can be true peers so that each user has the same rights and authority over the pooled collection and the contents of the pooled collection as any other user. Alternatively, one user, such as a user creating the pooled collection or a user having contributed the most resources to the pooled collection, can be designated as a primary user that has a greater amount of authority over the pooled collection for example.

Figure 3:
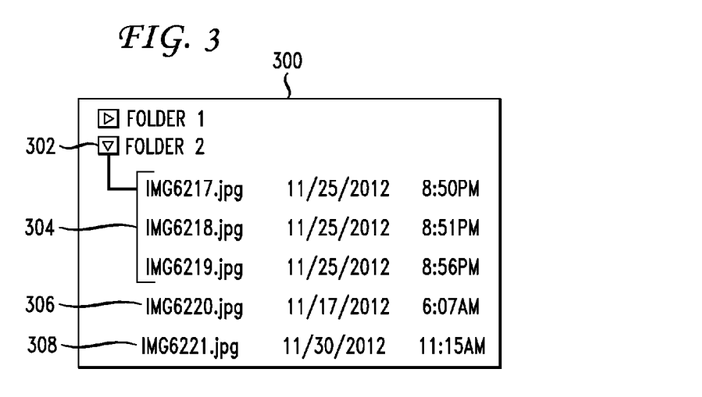
FIG. 3 shows an example file listing for a first account.
Figure 4:
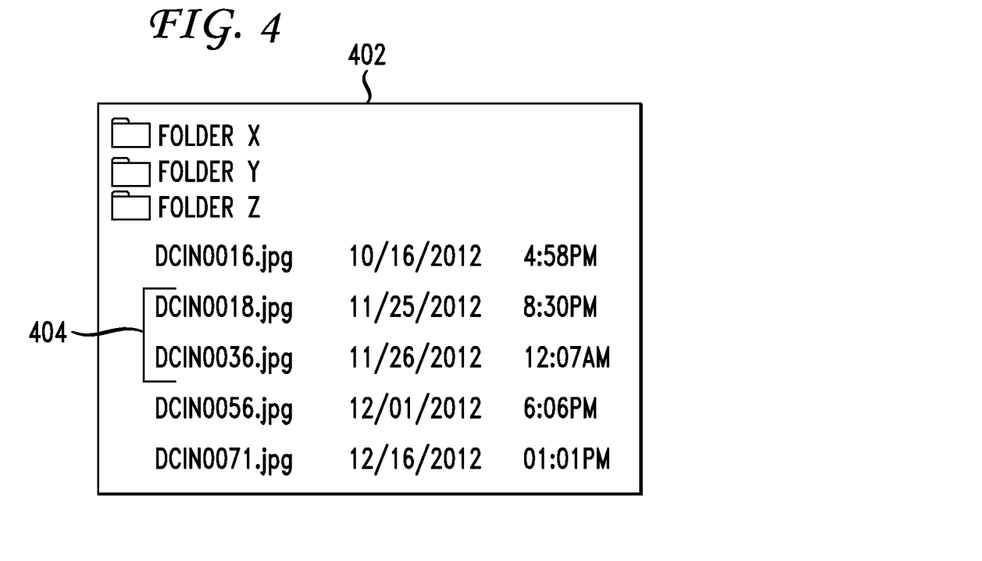
FIG. 4 shows an example file listing for a second account.

FIG. 3 shows an example file listing 300 for a first account. File listing 300 shows folder 302 with three content items 304 uploaded within a single predefined period of time, (such as fifteen minutes, one hour, two hours, etc.) as well as two other content items 306, 308 that were uploaded during different predefined periods of time (such as on different days). FIG. 4 shows an example file listing for second account 402 with different content items, including two content items 404 that were uploaded within a few hours of each other, but on different days. The three content items 304 in the first account and the two content items 404 in the second account are date-stamped within a same general period of time, which may correspond to an evening event such as a party, dinner, conference, or theater performance.

Figure 5:
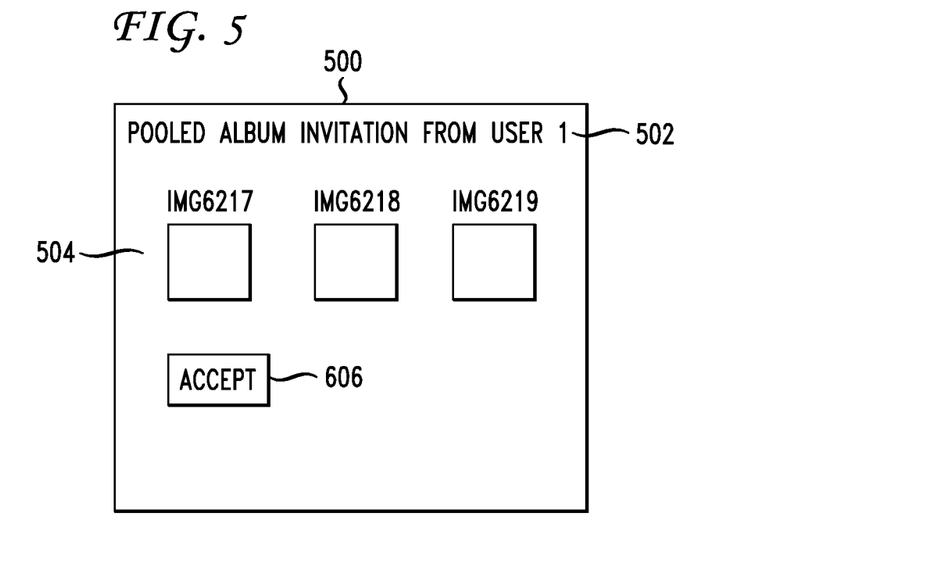
FIG. 5 shows an example pooled collection invitation from the first account to the second account.

A user of the first account can create a pooled collection for photos of the event, and invite others who participated in the event to view the pooled collection, and desirably contribute their own photos of the event to the pooled collection. FIG. 5 shows an example pooled collection invitation 500 from the first account to the second account. The invitation 500 can include a title 502, a listing 504 of files already included in the pooled collection, an optional preview of the included files, and an actuatable icon 506 or other mechanism for the recipient to accept the invitation. When the recipient accepts the invitation, the system can either prompt the recipient to select files to add to the pooled collection, can suggest files to add to the pooled collection which the recipient can approve, or the system can scan the recipient's files to identify files that can then be automatically added to the pooled collection.

An event associated with a pooled collection can be in progress over a period of time, so that users can add photos to the pooled collection at multiple points over the period of time. For example, the event may be a weeklong conference, and a user may upload photos at the end of each day throughout the week. Other users can also contribute photos, documents, blog posts, audio recordings, or videos to the pooled collection throughout the weeklong conference or even weeks or months after the conference has concluded. The system can automatically determine or suggest a beginning or ending time for the event, based on information such as content item metadata or user calendar entries. Alternatively, the user can manually indicate which photo uploads should be associated with the pooled collection.

The system can automatically identify one or more commonalities that define a pooled collection. For example, the commonalities for the weeklong conference can include a common location and a common time period. The system can then scan through files of others' accounts to locate files that can be included in the pooled collection. The system can limit the search for other files to users who are within a threshold social network distance, or to users who work for a same company or share a common title at work or a common set of interests, etc. The system can create overlapping pooled collections that share part of the same set of files, but are pooled based on different commonalities or user attributes to generate different subsets of the files for a specific audience or purpose.

Figure 6:
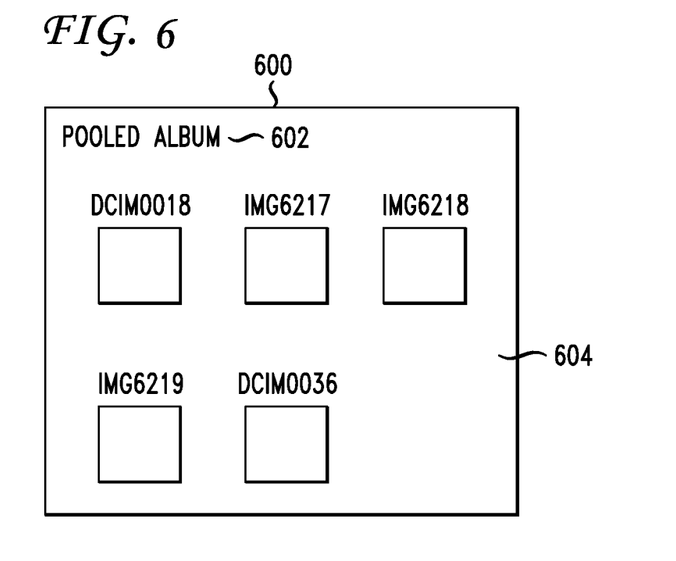
FIG. 6 shows an example file listing for the pooled collection.

Upon merging files from the first user and the second user, the pooled collection contains an updated listing of photos from a same event. FIG. 6 shows an example file listing 600 for the pooled collection created between the first account and the second account. The file listing 600 can include a title 602, which either the first user or the second user can create or modify, as well as a combined listing of files 604 contributed by both users. The pooled collection can sort the combined listing of files 604 according to any attribute of the files or their associated metadata. Similarly, the pooled collection can group the combined listing of files 604 according to which user contributed the files.

Figure 7:
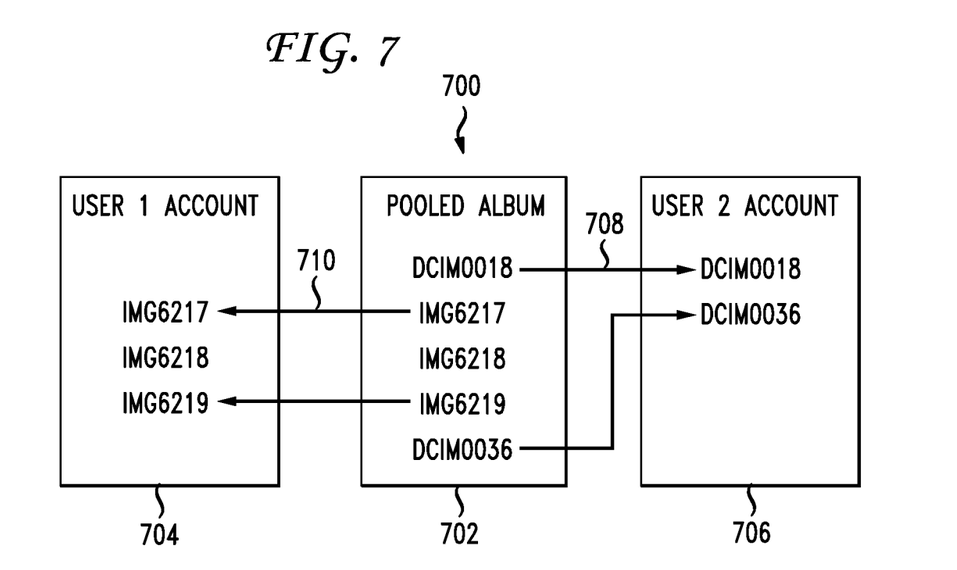
FIG. 7 shows sources for files in the pooled collection.

FIG. 7 shows arrangement 700 of sources for files in the pooled collection 702 and one possible variation for how the files are contributed to the pooled collection using pointers. In this example first account 704 and second account 706 are sources that contribute files to the pooled collection 702. In this example, the pooled collection 702 contains a list of pointers. When a user accesses one of the pointers, the system de-references the pointer to determine where the corresponding file is located and can fetch that file. In this example, the content item DCIM0018 is actually a pointer 708 to the location of the corresponding file in the second user account 706, and the content item IMG6217 is actually a pointer 710 to the location of the corresponding file in the first user account 704. In one variation, the pooled collection 702 contains a hybrid of files that are contained in the pooled collection and pointers 708, 710 to files contained in other accounts. For example, IMG6218 in pooled collection 702 is shown as being stored in pooled collection 702 directly, so no arrow representing a pointer is shown from pooled collection 702 to account 704 because IMG6218 exists in first account 704 and a copy of IMG6218 exists in pooled collection 702. Users who access files associated with the pooled collection may or may not be aware of whether a particular file is an actual file or a pointer to the appropriate file.

Figure 8:
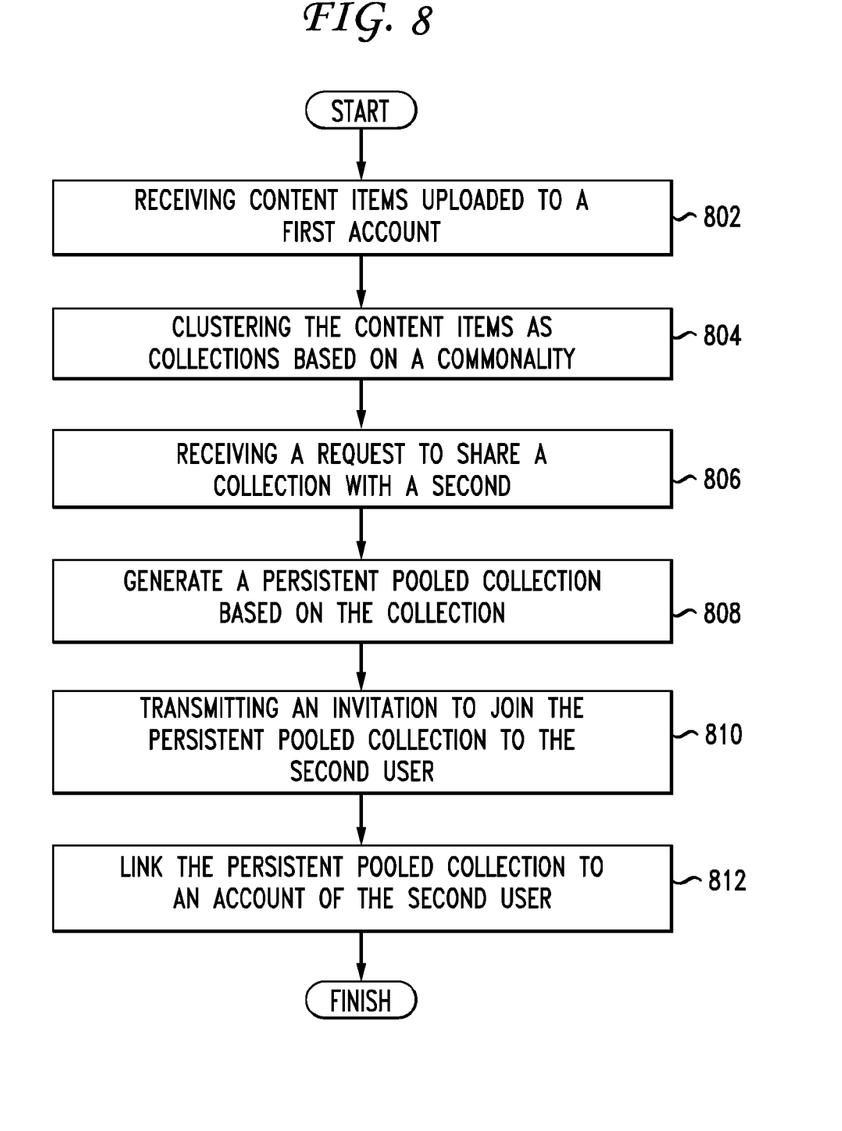
FIG. 8 shows a first example method embodiment for generating a pooled collection.
Figure 9:
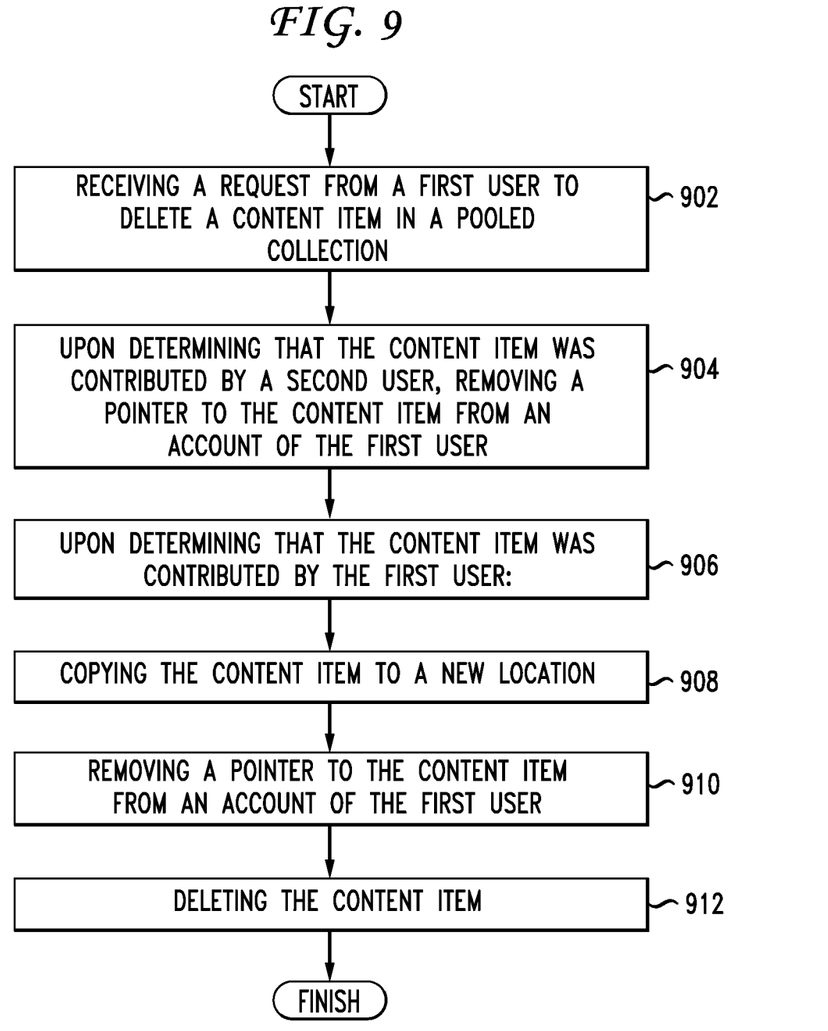
FIG. 9 shows an example method embodiment for handling deletions from a pooled collection.

Having disclosed some system components and concepts, the disclosure now turns to the exemplary method embodiments shown in FIGS. 8 and 9. For the sake of clarity, the methods are described in terms of an exemplary system 100, as shown in FIG. 1, configured to practice the method. The steps outlined herein are exemplary and can be implemented in any combination thereof, including combinations that exclude, add, or modify certain steps.

FIG. 8 shows a first example method embodiment for generating a pooled collection. The system receives, from a client device, content items uploaded to a first account at a content management system (802). The system clusters at least some of the content items as a collection corresponding to a commonality for the pooled collection (804), such as chronological boundaries. The system can optionally cluster the content items into sets corresponding to time and location, based on content tags, or according to file path, for example. The system can cluster content items based on any single content item attribute or a combination of content item attributes. The system can automatically recognize commonalities for clustering content items, or a user can provide input or a commonality preference for clustering. For example, for a grouping of photographs, a user can indicate that the commonality preference is a dominant color of the photographs. The system can notify the first user or other user of the sets, or can generate a log entry reflecting the clustering. Notifications can include information such as a number of content items, a location, a date, a time, or a set storage size.

The system receives, from the first user, a request to share the collection with a second user having a second account at the content management system (806). In one variation, the system presents a list of content items in the collection to the first user prior to the request to share the collection. The system receives input from the first user indicating a list of content items to include in the collection, and updates the collection based on the input. The system generates, in response to the request, a persistent pooled collection at the content management system from the collection (808). The system can generate the persistent pooled collection by generating pointers in the persistent pooled collection that reference the content items uploaded to the first account.

The system can transmit an invitation to join the persistent pooled collection to the second user (810). Upon the second user accepting the invitation, the system links the persistent pooled collection to the second account so that the first user and the second user have access to content items in the persistent pooled collection and have permission to contribute content items to the persistent pooled collection (812). The system can update the collection by at least one of adding, removing, moving, copying, or renaming an content item in the collection, or editing collection details. After the pooled collection is created, the system can track changes to one of the persistent pooled collection or content items in the persistent pooled collection in a revision history. In this variation, the system can provide an interface for browsing the revision history and restore a previous version of a content item in the persistent pooled collection.

The system can continue to populate the persistent pooled collection by identifying second content items in the second account that correspond to the commonality, and transmitting to the second user a notification suggesting that second content items be added to the persistent pooled collection. Upon receiving an affirmative response to the notification from the second user, adding the second content items to the persistent pooled collection. Generating the persistent pooled collection can include generating pointers in the persistent pooled collection, wherein the pointers reference the second content items in the second account.

FIG. 9 shows an example method embodiment for handling deletions from a pooled collection. The system can receive, from a first user device associated with a pooled collection including a persistent collection of pointers referencing content items from multiple user accounts in a content management system, a request to delete a content item in the pooled collection, wherein the first user is associated with a first user account (902). While this example discusses content items, the principles set forth herein are equally applicable to files of any type organized into logical pooled collection. Upon determining that the content item is contributed to the pooled collection from a second user account, the system can remove a pointer to the content item from an instance of the pooled collection associated with the first user (904).

Upon determining that the content item is contributed to the pooled collection from the first user account (906), the system can copy the content item to a new location outside of the first user account (908), remove the pointer to the content item from the instance of the pooled collection associated with the first user (910), and delete the content item from the first user account (912). The new location outside of the first user account can be a storage space associated with the pooled collection. The new location outside of the first user account can include a user account associated with another user of the pooled collection. In one variation, the system further updates the pointer in the pooled collection to reference the new location for remaining users of the pooled collection other than the first user. The system can copy the content item to a new location by copying the content item to each user account, other than the first user account, associated with the pooled collection, essentially replicating the content item to respective storage spaces associated with each other account. Alternatively, the system can copy the content item to a new location by identifying a primary user of the pooled collection, and a primary user account associated with the primary user, then copying the content item to the primary user account. The system can notify the primary user that the content item has been copied to the primary user account. The system can select any user of the pooled collections as the primary user.

Alternatively, the user can request that a content item be deleted from a pooled collection, and that the content item be completely removed from the pooled collection rather than the content item remaining available for other users of the pooled collection. In this case, the system can link an original version of the content item in the contributing user's account with a copy of the content item in the pooled collection. Then, when the contributing user deletes the original version of the content item, the system can automatically follow the link to the copy of the content item in the pooled collection and delete the copy of the content item as well.

The system can maintain a revision history for pooled collection to go back in time to any revision time. Whenever a user deletes a file from the pooled collection, the pooled collection stops tracking that file in the user's space, and copies the file to someone else's space or account. The system can allow file tags for that file to record the revision history up to the point when the file was in a non-deleted state. That way the user can always access the revisions during which the file was 'live' and not yet deleted. The revision history data can persist indefinitely at the system, but the actual data itself may persist somewhere, but not in the user's account space. However, in order to preserve the deleted file for other users in the pooled collection, the system can copy the data to some other location, such as another user's account who is willing to host or store that data. In one variation, if ten users are participating in a pooled collection and one user deletes a photo, the system duplicates the deleted photo to all nine remaining users of the pooled collection. In another variation, the deleted photo is divided among two or more users as photo components that the system can reconstitute to obtain the photo data. The space and/or files contributed by a user to the pooled collection and subsequently deleted may remain in the user's account and accessible to others in the group after deletion, but appear invisible to the user who requested the deletion.

Figure 10A:
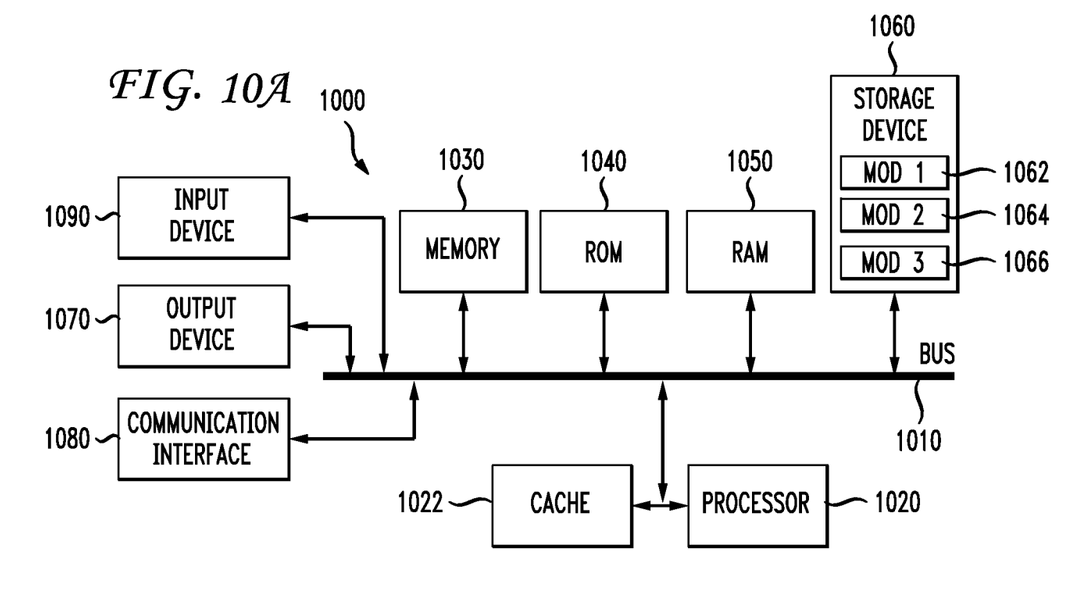
FIG. 10A shows a conventional system bus computing system architecture.
Figure 10B:
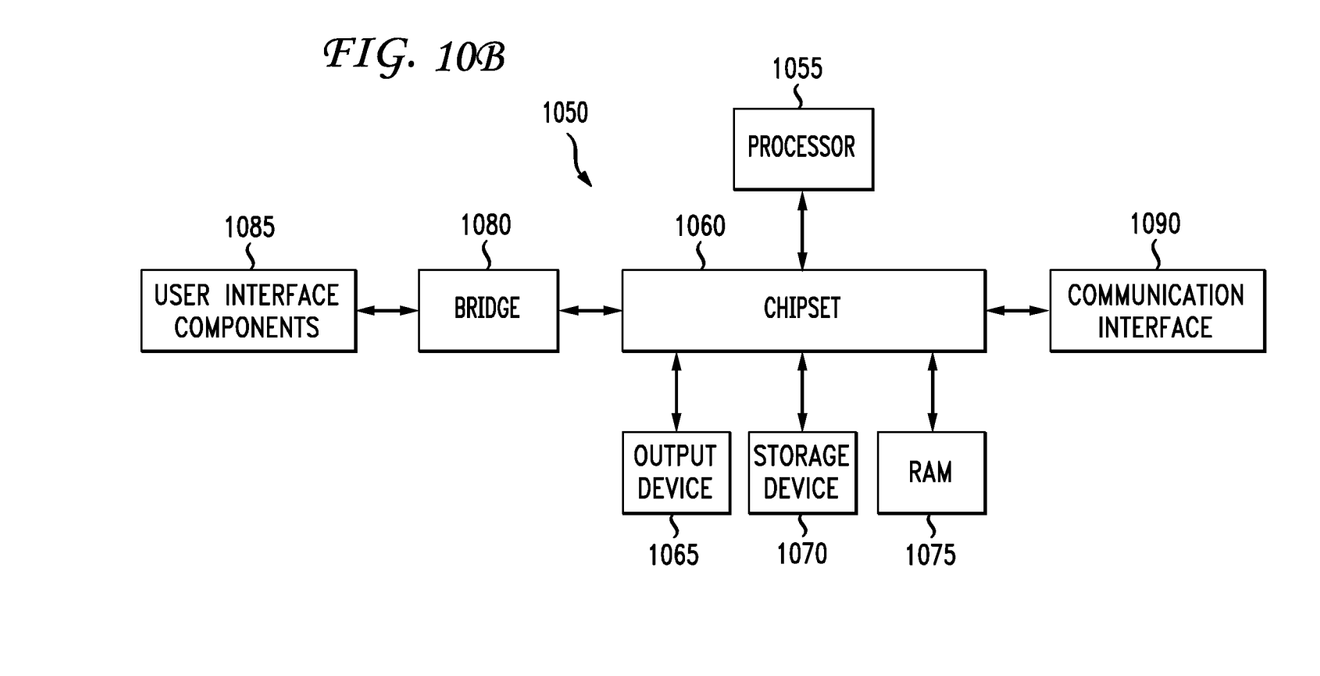
FIG. 10B shows a computer system having a chipset architecture.

FIG. 10A, and FIG. 10B show exemplary possible system embodiments. The more appropriate embodiment will be apparent to those of ordinary skill in the art when practicing the present technology. Persons of ordinary skill in the art will also readily appreciate that other system embodiments are possible.

FIG. 10A shows a conventional system bus computing system architecture 1000 wherein the components of the system are in electrical communication with each other using a bus 1005. Exemplary system 1000 includes a processing unit (CPU or processor) 1010 and a system bus 1005 that couples various system components including the system memory 1015, such as read only memory (ROM) 1020 and random access memory (RAM) 1025, to the processor 1010. The system 1000 can include a cache of high-speed memory connected directly with, in close proximity to, or integrated as part of the processor 1010. The system 1000 can copy data from the memory 1015 and/or the storage device 1030 to the cache 1012 for quick access by the processor 1010. In this way, the cache can provide a performance boost that avoids processor 1010 delays while waiting for data. These and other modules can control or be configured to control the processor 1010 to perform various actions. Other system memory 1015 may be available for use as well. The memory 1015 can include multiple different types of memory with different performance characteristics. The processor 1010 can include any general purpose processor and a hardware module or software module, such as module 1 1032, module 2 1034, and module 3 1036 stored in storage device 1030, configured to control the processor 1010 as well as a special-purpose processor where software instructions are incorporated into the actual processor design. The processor 1010 may essentially be a completely self-contained computing system, containing multiple cores or processors, a bus, memory controller, cache, etc. A multi-core processor may be symmetric or asymmetric.

To enable user interaction with the computing device 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the computing device 1000. The communications interface 1040 can generally govern and manage the user input and system output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof.

The storage device 1030 can include software modules 1032, 1034, 1036 for controlling the processor 1010. Other hardware or software modules are contemplated. The storage device 1030 can be connected to the system bus 1005. In one aspect, a hardware module that performs a particular function can include the software component stored in a computer-readable medium in connection with the necessary hardware components, such as the processor 1010, bus 1005, display 1035, and so forth, to carry out the function.

FIG. 10B shows a computer system 1050 having a chipset architecture that can be used in executing the described method and generating and displaying a graphical user interface (GUI). Computer system 1050 is an example of computer hardware, software, and firmware that can be used to implement the disclosed technology. System 1050 can include a processor 1055, representative of any number of physically and/or logically distinct resources capable of executing software, firmware, and hardware configured to perform identified computations. Processor 1055 can communicate with a chipset 1060 that can control input to and output from processor 1055. In this example, chipset 1060 outputs information to output 1065, such as a display, and can read and write information to storage device 1070, which can include magnetic media, and solid state media, for example. Chipset 1060 can also read data from and write data to RAM 1075. A bridge 1080 for interfacing with a variety of user interface components 1085 can be provided for interfacing with chipset 1060. Such user interface components 1085 can include a keyboard, a microphone, touch detection and processing circuitry, a pointing device, such as a mouse, and so on. In general, inputs to system 1050 can come from any of a variety of sources, machine generated and/or human generated.

Chipset 1060 can also interface with one or more communication interfaces 1090 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1055 analyzing data stored in storage 1070 or 1075. Further, the machine can receive inputs from a user via user interface components 1085 and execute appropriate functions, such as browsing functions by interpreting these inputs using processor 1055.

It can be appreciated that exemplary systems 1000 and 1050 can have more than one processor 1010 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A system comprising:
a processor;
a non-transitory computer-readable storage medium having stored therein instructions which, when executed by the processor, cause the processor to:
receive from a first user having a first account at a synchronized online content management system, a request to share a collection with a second user having a second account at the synchronized online content management system;
generate, in response to the request, a persistent pooled collection at the content management system based on the collection;
transmit, to a device associated with the second user, an invitation to join the persistent pooled collection;

upon the second user accepting the invitation, link the persistent pooled collection to the first account and the second account so that the first user and the second user have access to content items in the persistent pooled collection and have permission to contribute content items to the persistent pooled collection;

scan second content items stored in the second account, based on a commonality, to identify additional content items to contribute to the persistent pooled collection; and add the additional content items to the persistent pooled collection.

2. The system of claim 1, further comprising instructions for causing the processor to:

cluster the content items into sets corresponding to time or location.

3. The system of claim 2, further comprising instructions for causing the processor to:

notify the first user of the sets.

4. The system of claim 3, wherein notifying the first user of the sets further comprises notifying the first user of at least one of a number of content items, a location, a date, a time, or a set storage size.

5. The system of claim 1, further comprising instructions for causing the processor to:

present a list of content items in the collection to the first user prior to the request to share the collection;

receive input from the first user indicating a list of content items to include in the collection; and update the collection based on the input.

6. The system of claim 5, wherein updating the collection comprises at least one of adding, removing, moving, copying, or renaming an content item in the collection, or editing album details.

7. The system of claim 1, further comprising instructions for causing the processor to:

track changes to one of the persistent pooled collection or content items in the persistent pooled collection in a revision history.

8. The system of claim 7, further comprising instructions for causing the processor to:

provide an interface for browsing the revision history and restoring a previous version of an content item in the persistent pooled collection.

9. The system of claim 1, wherein generating the persistent pooled collection comprises generating pointers in the persistent pooled collection, wherein the pointers reference the content items uploaded to the first account.

10. The system of claim 1, further comprising instructions for causing the processor to:

identify additional second content items in the second account which correspond to chronological boundaries;

transmit to the second user a notification suggesting that second content items be added to the persistent pooled collection; and upon receiving an affirmative response to the notification from the second user, add the second content items to the persistent pooled collection.

11. The system of claim 10, wherein generating the persistent pooled collection comprises generating pointers in the persistent pooled collection, wherein the pointers reference the second content items in the second account.

12. The system of claim 1, further comprising instructions for causing the processor to:

perform a content analysis of the content items to determine the second user.

13. The system of claim 12, wherein the content analysis is based on at least one of location data, face recognition, content item metadata, content item tags, or exchangeable content item file format (EXIF) data.

14. A non-transitory computer-readable storage medium having stored therein instructions which, when executed by a processor, cause the processor to:

receiving, from a first user having a first account at a synchronized online content management system, a request to share a collection with a second user having a second account at the content management system;

generating, in response to the request, a persistent pooled collection at the content management system from the collection;

transmitting an invitation to join the persistent pooled collection to the second user;

upon the second user accepting the invitation, linking the persistent pooled collection to the first account and the second account so that the first user and the second user have access to images in the persistent pooled collection and have permission to contribute images to the persistent pooled collection;

scanning second content items stored in the second account, based on a commonality, to identify additional content items to contribute to the persistent pooled collection; and adding the additional content items to the persistent pooled collection.

15. The non-transitory computer-readable storage medium of claim 14, further comprising instructions for causing the processor to:

presenting a list of content items in the collection to the first user prior to the request to share the collection;

receiving input from the first user indicating a list of content items to include in the collection; and updating the collection based on the input.

16. The non-transitory computer-readable storage medium of claim 15, wherein updating the collection comprises at least one of adding, removing, moving, copying, or renaming an content item in the collection, or editing album details.

17. The non-transitory computer-readable storage medium of claim 14, further comprising instructions for causing the processor to:

tracking changes to one of the persistent pooled collection or content items in the persistent pooled collection in a revision history.

18. The non-transitory computer-readable storage medium of claim 17, further comprising instructions for causing the processor to:

providing an interface for browsing the revision history and restoring a previous version of an content item in the persistent pooled collection.

19. The non-transitory computer-readable storage medium of claim 14, wherein generating the persistent pooled collection comprises generating pointers in the persistent pooled collection, wherein the pointers reference the content items uploaded to the first account.

20. The non-transitory computer-readable storage medium of claim 14, further comprising instructions for causing the processor to:

performing a content analysis of the content items to determine the second user.

* * * * *